United States Patent
Asahara

(10) Patent No.: US 11,322,957 B2
(45) Date of Patent: May 3, 2022

(54) CHARGER, CHARGING SYSTEM, AND METHOD FOR DISCONNECTING CHARGING TERMINAL

(71) Applicant: Toyota Jidosha Kabushiki Kaisha, Toyota (JP)

(72) Inventor: Yoshiaki Asahara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 16/747,990

(22) Filed: Jan. 21, 2020

(65) Prior Publication Data
US 2020/0235595 A1 Jul. 23, 2020

(30) Foreign Application Priority Data

Jan. 23, 2019 (JP) .............................. JP2019-009488

(51) Int. Cl.
*H02J 7/00* (2006.01)
*B25J 19/00* (2006.01)

(52) U.S. Cl.
CPC .......... *H02J 7/0045* (2013.01); *H02J 7/0044* (2013.01); *B25J 19/005* (2013.01)

(58) Field of Classification Search
CPC ...... H02J 7/0044; H02J 7/0045; H02J 7/0029; B25J 19/005
USPC ........................................ 320/107, 110, 115
See application file for complete search history.

(56) References Cited

U.S. PATENT DOCUMENTS

| 10,897,106 | B2* | 1/2021 | Taguchi | H01R 13/707 |
| 2010/0085007 | A1* | 4/2010 | Shu | H02J 7/0045 |
| | | | | 320/107 |
| 2015/0270729 | A1* | 9/2015 | Isobe | H02J 7/0042 |
| | | | | 320/107 |
| 2016/0003270 | A1* | 1/2016 | Franklin | H01F 7/0221 |
| | | | | 439/529 |
| 2016/0102805 | A1* | 4/2016 | Khodapanah | F16M 11/10 |
| | | | | 248/224.8 |
| 2017/0317444 | A1* | 11/2017 | Narayanasamy | H02J 7/0045 |
| 2020/0044386 | A1* | 2/2020 | Pabouctsidis | H01R 12/7005 |

FOREIGN PATENT DOCUMENTS

| DE | 102010025951 A1 | 1/2012 |
| JP | 6115502 B2 | 4/2017 |

* cited by examiner

*Primary Examiner* — Edward Tso
*Assistant Examiner* — Aaron Piggush
(74) *Attorney, Agent, or Firm* — Dinsmore & Shohl LLP

(57) ABSTRACT

The present disclosure provides a charger capable of improving the portability thereof. The charger is a charger including a second charging terminal configured to be magnetically connected to a first charging terminal provided on a mobile body to supply power to the first charging terminal, the charger further including: a stand; a suspension member configured to suspend the second charging terminal from the stand; and a displacement inducing mechanism configured to induce, in order to reduce a magnetic connecting force between the first and the second charging terminals, relative displacement between the first and the second charging terminals in a direction different from an axial direction of the second charging terminal.

5 Claims, 13 Drawing Sheets

CHARGER, CHARGING SYSTEM, AND METHOD FOR DISCONNECTING CHARGING TERMINAL

CROSS REFERENCE TO RELATED APPLICATIONS

This application is based upon and claims the benefit of priority from Japanese patent application No. 2019-009488, filed on Jan. 23, 2019, the disclosure of which is incorporated herein in its entirety by reference.

BACKGROUND

The present disclosure relates to a charger, a charging system, and a method for disconnecting a charging terminal, and for example, to a charger including a second charging terminal magnetically connected to a first charging terminal provided on a mobile body to supply power to the first charging terminal, a charging system, and a method for disconnecting a charging terminal.

When a mobile body is charged, it is necessary to connect a charging terminal of the mobile body to the charging terminal of the charger. Thus, if the position of the mobile body is deviated from a predetermined charging position, the charging terminals cannot be satisfactorily connected to each other.

Accordingly, the charger is able to absorb the position error of the mobile body and connect the charging terminals to each other even when the position of the mobile body is deviated from the predetermined charging position. Therefore, the charger disclosed in Japanese Patent No. 6115502 can absorb the position error of a mobile body by suspending a charging terminal of the charger.

SUMMARY

The applicant has however found the following problems. In the charger disclosed in Japanese Patent No. 6115502, the charging terminal of the charger is suspended, and thus, when the charging terminal of the mobile body is disconnected from the charging terminal of the charger, it is necessary to apply a large disconnecting force to a part connecting the charging terminals to each other by moving the mobile body and strongly pulling the charging terminal of the mobile body. At this time, in order to prevent the charger from falling over, it is necessary to take measures such as fixing the charger in the surroundings or making the charger heavy. This configuration causes a problem that the portability of the charger deteriorates.

The present disclosure has been made in view of the above-described problem and provides a charger, a charging system, and a method for disconnecting a charging terminal that can improve the portability of the charger.

A first exemplary aspect is a charger including a second charging terminal configured to be magnetically connected to a first charging terminal provided on a mobile body to supply power to the first charging terminal, the charger further including:

a stand;

a suspension member configured to suspend the second charging terminal from the stand; and a displacement inducing mechanism configured to induce, in order to reduce a magnetic connecting force between the first and the second charging terminals, relative displacement between the first and the second charging terminals in a direction different from an axial direction of the second charging terminal.

Such a configuration enables a charger to be less likely to fall over when it is pulled by a mobile body and to be reduced in weight compared to the charger disclosed in Japanese Patent No. 6115502, thereby improving the portability of the charger.

In the above-described charger, the displacement inducing mechanism may include a pulling member configured to connect the stand to the second charging terminal, and the pulling member generate a pulling force as a reaction force when a lateral force is applied to the second charging terminal, pull the second charging terminal, and then induce relative displacement between the first and the second charging terminals.

As the above-described charger has such a simple configuration using the pulling member as the displacement inducing mechanism as described above, it is possible to prevent the weight of the charger from increasing.

In the above-described charger, the pulling member may be located on one side of the stand in a lateral direction thereof with the second charging terminal interposed therebetween, one end of the pulling member be connected to the stand, and the other end thereof be connected to the second charging terminal.

Such a configuration makes it possible to swing the second charging terminal more widely in the lateral direction of the stand.

In the above-described charger, the displacement inducing mechanism may further include an actuator provided in one of the first and the second charging terminals, and the actuator push, while the first and the second charging terminals are magnetically connected to each other, the other of the first and the second charging terminals and induce relative displacement between the first and the second charging terminals.

As the above-described charger has such a simple configuration in which the other of the first and the second charging terminals is pushed by the actuator as described above, it is possible to prevent the weight of the charger from increasing.

Another exemplary aspect is a charging system, including: the above-described charger; and a mobile body including a first charging terminal.

Such a configuration enables a charger to be less likely to fall over when it is pulled by a mobile body and be reduced in weight compared to the charger disclosed in Japanese Patent No. 6115502, thereby improving the portability of the charger.

Another exemplary aspect is a method for disconnecting a charging terminal comprising disconnecting a first charging terminal provided in a mobile body from a second charging terminal suspended by a suspension member from a stand of a charger from a state where the first charging terminal and the second charging terminal are magnetically connected to each other, the method including inducing, in order to reduce a magnetic connecting force between the first and the second charging terminals, relative displacement between the first and the second charging terminals in a direction different from an axial direction of the second charging terminal.

Such a configuration enables a charger to be less likely to fall over when it is pulled by a mobile body and be reduced in weight compared to the charger disclosed in Japanese Patent No. 6115502, thereby improving the portability of the charger.

In the above-described method for disconnecting a charging terminal, the mobile body may be moved in a direction in which it is spaced apart from the charger and the second charging terminal be pulled by the pulling member connecting the stand to the second charging terminal so that a lateral force is applied to the second charging terminal, and then relative displacement between the first and the second charging terminals be induced.

By inducing relative displacement between the first and the second charging terminals by the pulling member as described above, it is possible to prevent the weight of the charger from increasing.

In the above-described method for disconnecting a charging terminal, the mobile body may be rotated while it is moved in the direction in which the mobile body is spaced apart from the charger.

This configuration reduces the force by which the mobile body pulls the second charging terminal through the first charging terminal in order to disconnect the first charging terminal from the second charging terminal. Accordingly, the charger can be reduced in weight, and the portability of the charger can be further improved.

In the above-described method for disconnecting a charging terminal, while the first and the second charging terminals are magnetically connected to each other, the actuator provided in one of the first and the second charging terminals push the other of the first and the second charging terminals and induce relative displacement between the first and the second charging terminals.

By inducing relative displacement between the first and the second charging terminals by the actuator as described above, it is possible to prevent the weight of the charger from increasing.

According to the present disclosure, it is possible to provide a charger, a charging system, and a method for disconnecting a charging terminal that can improve the portability of the charger.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5A shows a state in which the mobile body approaches the charger in order to magnetically connect the charging terminals to each other, and FIG. 5B shows a state immediately after the charging terminals are magnetically connected to each other;

FIG. 6A shows a state in which the mobile body approaches the charger in order to magnetically connect the charging terminals to each other, FIG. 6B shows a state immediately after the charging terminals are magnetically connected to each other, and FIG. 6C schematically shows a state in which the mobile body has reached a predetermined charging position;

FIG. 7A shows a state before the charging terminals are disconnected from each other, FIG. 7B shows a state immediately before the charging terminals are disconnected from each other, and FIG. 7C shows a state in which the charging terminals have been disconnected from each other;

FIG. 8A shows a state immediately before the charging terminals are disconnected from each other, and FIG. 8B shows a state in which the charging terminals have been disconnected from each other;

DESCRIPTION OF EMBODIMENTS

Specific embodiments to which the present disclosure is applied will be described hereinafter in detail with reference to the drawings. However, the present disclosure is not limited to the embodiments shown below. Further, for the clarification of the explanation, the following descriptions and the drawings are simplified as appropriate.

First Embodiment

Figure 1:
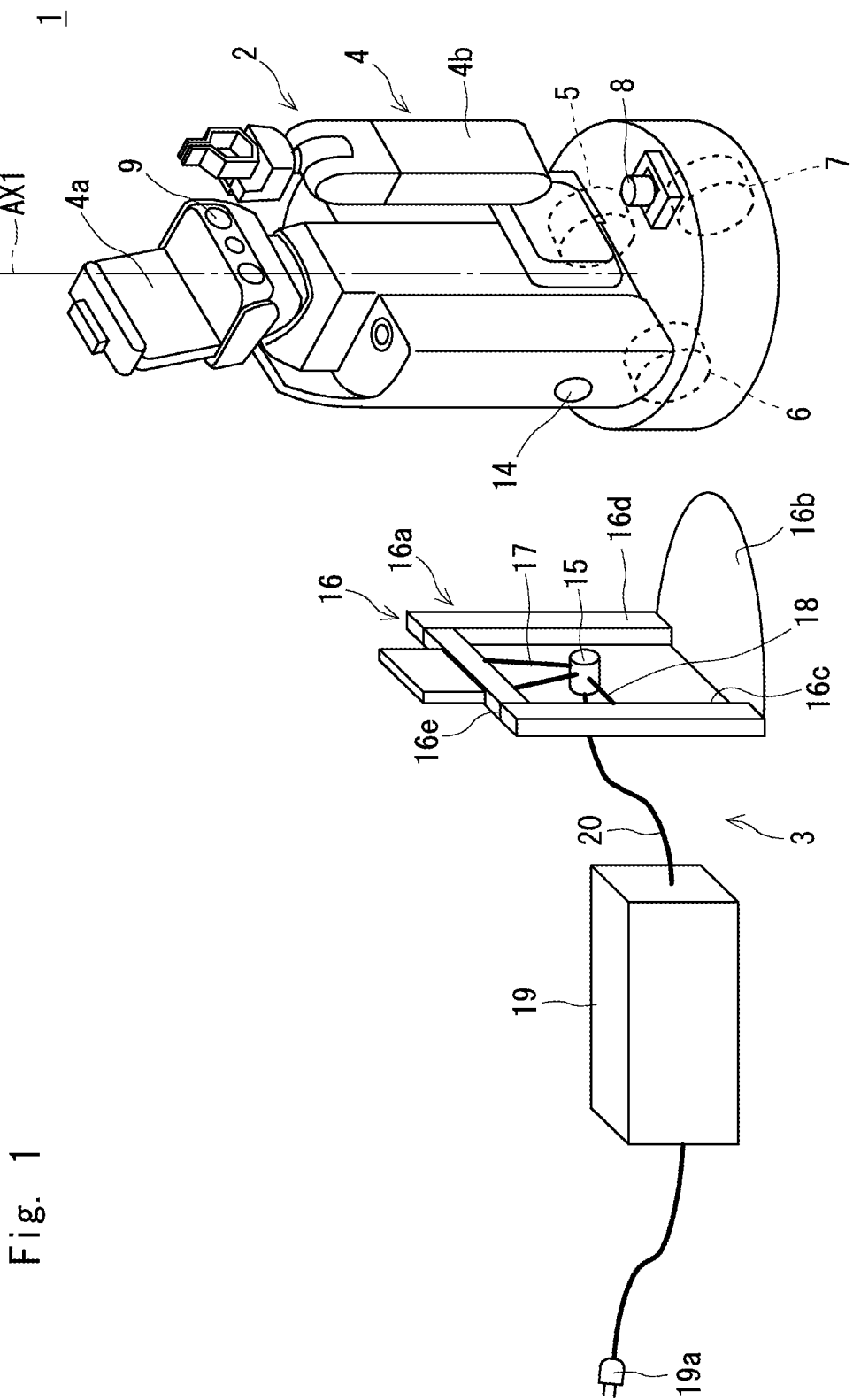
FIG. 1 is a perspective view schematically showing a charging system according to a first embodiment.
Figure 2:
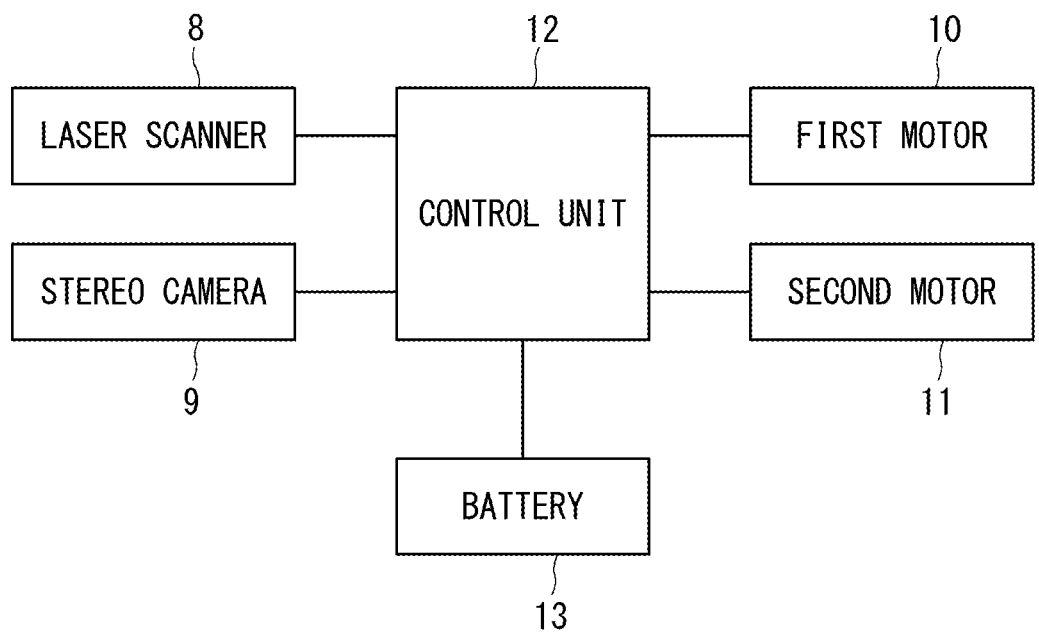
FIG. 2 is a block diagram of a control system of a mobile body according to the first embodiment.

First, a configuration of a charger for a mobile body according to this embodiment is described. FIG. 1 is a perspective view schematically showing a charging system according to this embodiment. FIG. 2 is a block diagram of a control system of the mobile body according to this embodiment. Note that in FIG. 1, the mobile body, charging terminals, and the like are simplified.

A charging system 1 includes a mobile body 2 and a charger 3 as shown in FIG. 1. As shown in FIGS. 1 and 2, the mobile body 2 includes a body part 4, a first driving wheel 5, a second driving wheel 6, a caster 7, a laser scanner 8, a stereo camera 9, a first motor 10, a second motor 11, a control unit 12, a battery 13, and a first charging terminal 14.

The body part 4 may include, for example, a display unit 4a including a touch panel for inputting a task executed by the mobile body 2, and an arm part 4b for grasping an object to be grasped. The first and the second driving wheels 5 and 6 are fixed to the bottom surface of the body part 4, and the rotation axes of which are arranged substantially coaxially with each other. The caster 7 is the so-called swivel caster, and is fixed to the bottom of the body part 4.

The laser scanner 8 is fixed to the body part 4 and detects an obstacle around the mobile body 2. The stereo camera 9 is fixed to the body part 4 and detects an environment image around the mobile body 2. The first motor 10 rotationally drives the first driving wheel 5. The second motor 11 rotationally drives the second driving wheel 6.

The control unit 12 is, for example, a Central Processing Unit (CPU), and executes a program for causing the mobile body 2 to move autonomously and controls the first and the second motors 10 and 11, and the like based on detection signals of the laser scanner 8 and the stereo camera 9. Note that the details of the autonomous movement of the mobile body 2 are not an essential part of the present disclosure, and the description thereof is thus omitted. However, the mobile body 2 may be configured to move based on an operation from outside.

It should be noted that the mobile body 2 goes straight when the first and the second driving wheels 5 and 6 are rotated at the same rotation speed in the same direction, and rotates around a rotation axis AX1 passing through substantially the center of the first and the second driving wheels 5 and 6 when the first and the second driving wheels 5 and 6 are rotated at the same rotation speed in the reverse direction. That is, the mobile body 2 can move parallel to and rotate in a predetermined direction by controlling the rotational directions and the rotation speeds of each of the first and the second driving wheels 5 and 6.

The battery 13 supplies power to the laser scanner 8, the stereo camera 9, the first motor 10, and the second motor 11 through the control unit 12. The first charging terminal 14 is electrically connected to the charger 3 in order to charge the battery 13.

Figure 3:
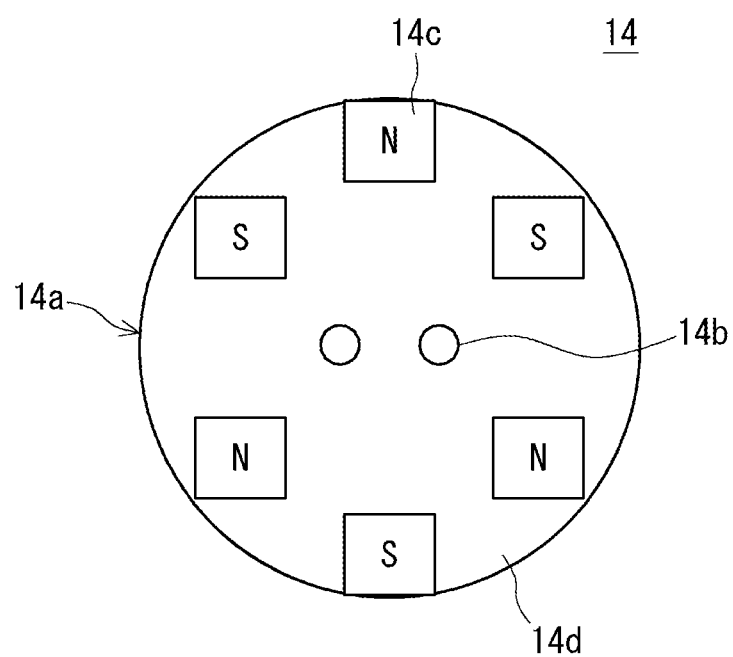
FIG. 3 is a diagram of a first charging terminal according to the first embodiment viewed from the front side thereof.

FIG. 3 is a diagram of the first charging terminal according to this embodiment viewed from the front side thereof. As shown in FIG. 3, the first charging terminal 14 includes a housing 14a, charging contacts 14b and magnets 14c. As shown in FIG. 1, the housing 14a is embedded in the lower part of the body part 4 of the mobile body 2, and a surface 14d (i.e., a surface facing a second charging terminal 15 of the charger 3, which will be described later, when the battery 13 is charged) of the housing 14a is exposed from the surface of the body part 4 of the mobile body 2.

The surface 14d of the housing 14a is formed substantially flat, and is located substantially along the peripheral surface of the body part 4. For example, when a part of the peripheral surface of the body part 4 is a circumferential surface, the surface 14d of the housing 14a is located substantially parallel to a tangent drawn to a preset position on the circumferential surface. The surface 14d of the housing 14a described above has, for example, a substantially circular shape when viewed from the direction orthogonal to the surface 14d. Note that the housing 14a may be integrated with the body part 4 of the mobile body 2.

The charging contacts 14b are exposed from the surface 14d of the housing 14a, and are arranged, for example, substantially at the center of the surface 14d of the housing 14a. The magnets 14c are arranged in the vicinity of the surface 14d of the housing 14a. It should be noted that the magnets 14c are arranged, for example, at substantially equal intervals along the periphery of the surface 14d of the housing 14a.

Figure 4:
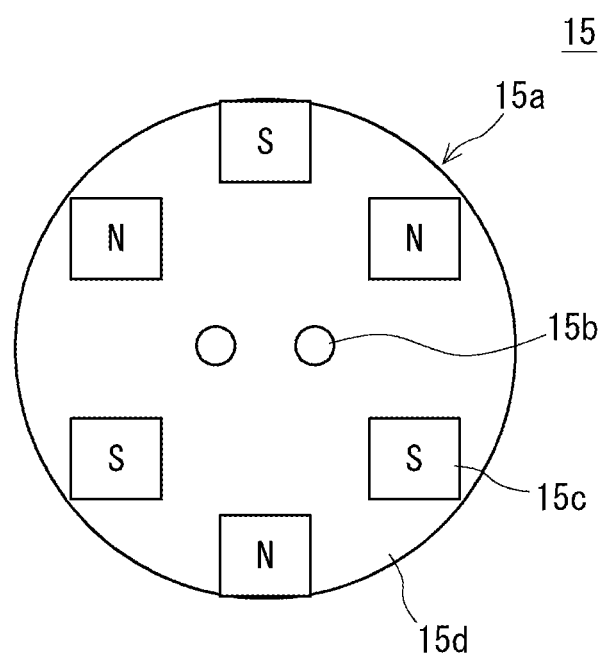
FIG. 4 is a diagram of a second charging terminal according to the first embodiment viewed from the front side thereof.

As shown in FIG. 1, the charger 3 includes the second charging terminal 15, a stand 16, a suspension member 17, a displacement inducing mechanism 18, and a control unit (charger body) 19. FIG. 4 is a diagram of the second charging terminal according to this embodiment viewed from the front side thereof. As shown in FIG. 4, the second charging terminal 15 includes a housing 15a, charging contacts 15b, and magnets 15c.

The housing 15a is a cylindrical body at least one end of which is closed. A surface 15d at one end of the housing 15a is substantially flat, and is located so as to be substantially orthogonal to the axial direction of the housing 15a (i.e., the direction in which the central axis of the housing 15a is extended: the axial direction of the second charging terminal 15). The surface 15d (i.e., the surface facing the surface 14d of the housing 14a of the first charging terminal 14 when the battery 13 is charged) of the housing 15a described above has, for example, a substantially circular shape having a diameter substantially equal to that of the surface 14d of the first charging terminal 14 when viewed from the axial direction of the housing 15a.

The charging contacts 15b are electrically connected to the charging contacts 14b of the first charging terminal 14. The charging contacts 15b are exposed from the surface 15d of the housing 15a, and are arranged, for example, substantially at the center of the surface 15d of the housing 15a.

The charging contacts 15b are electrically connected to the control unit 19 through a wire 20. As shown in FIG. 1, the control unit 19 includes a plug 19a, and can supply power to the charging contacts 15b, for example, by electrically connecting the plug 19a to an outlet for domestic use or the like. It should be noted that the control unit 19 switches supply or cutoff of power to the charging contacts 15b, for example, based on a signal indicating the position information of the mobile body 2 and a detection signal of a contact sensor and the like provided on the housing 15a of the second charging terminal 15.

The magnets 15c are magnetically connected to the magnets 14c of the charging terminal 14 of the mobile body 2. The magnets 15c are arranged in the vicinity of the surface 15d of the housing 15a so as to correspond to the magnets 14c of the first charging terminal 14. It should be noted that the magnets 15c are arranged, for example, at substantially equal intervals along the periphery of the surface 15d of the housing 15a.

However, the arrangement of the charging contacts 14b of the first charging terminal 14 and the charging contacts 15b of the second charging terminal 15 is not limited, and the charging contacts 14b and 15b may be arranged so that they can be satisfactorily electrically connected to one another. Further, the arrangement of the magnets 14c of the first charging terminal 14 and the magnets 15c of the second charging terminal 15 is not limited, and the magnets 14c and 15c may be arranged so that they can be satisfactorily electrically connected to one another.

The stand 16 suspends and supports the second charging terminal 15 through the suspension member 17 as shown in FIG. 1. The stand 16 includes, for example, a frame part 16a and a base part 16b. The frame part 16a has a gate-like shape having an opening 16c. Specifically, the frame part 16a is, for example, a plate-like body, and includes pillar parts 16d arranged at intervals and a beam part 16e laid between the upper ends of the pillar parts 16d.

The base part 16*b* supports the frame part 16*a* and prevents the stand 16 from falling over. The base part 16*b* is a plate-like body, and the lower ends of the pillar parts 16*d* of the frame part 16*a* are both fixed to the upper surface of the base part 16*b*. It should be noted that the base part 16*b* projects from at least one side of the opening 16*c* of the stand 16 in the penetration direction with the frame part 16*a* interposed therebetween, the detailed function of which will be described later.

The base part 16*b* is, for example, a plate-like body formed in a substantially semicircular shape, and the lower ends of the pillar parts 16*d* of the frame part 16*a* are respectively fixed to both ends of the linear part (i.e., the side forming a diameter). However, as will be described later, the stand 16 may have any shape as long as it does not fall over when the first charging terminal 14 is disconnected from the second charging terminal 15.

The suspension member 17 suspends the second charging terminal 15 as shown in FIG. 1. The upper end of the suspension member 17 is connected to the beam part 16*e* of the frame part 16*a*. Meanwhile, the lower end of the suspension member 17 is connected to the housing 15*a* of the second charging terminal 15. It should be noted that the axial direction of the second charging terminal 15 and the penetration direction of the opening 16*c* of the stand 16 substantially coincide with each other.

Note that the suspension member 17 may be located so as to be a substantially V-shape in which the interval becomes wider toward the upper direction as viewed from the penetration direction of the opening 16*c* of the stand 16. This configuration enables the swinging of the second charging terminal 15 to be easily converged when the second charging terminal 15 is swung in the lateral direction of the stand 16 (i.e., in the direction of the intervals between the pillar parts 16*d* of the stand 16).

Further, the suspension member 17 may suspend the second charging terminal 15 so that the surface 15*d* of the housing 15*a* of the second charging terminal 15 is located on the side where the base part 16*b* projects with respect to the frame part 16*a*, the detailed function of which will be described later. In addition, the suspension member 17 may be composed of, for example, an elastic member such as a stretchable rubber or a spring. Furthermore, the upper end of the suspension member 17 may be removable from the beam part 16*e* of the frame part 16*a*, or the lower end of the suspension member 17 be removable from the housing 15*a* of the second charging terminal 15.

The displacement inducing mechanism 18 induces, in order to reduce a magnetic connecting force between the first and the second charging terminals 14 and 15, relative displacement between the first and the second charging terminals 14 and 15 in the direction different from the axial direction of the second charging terminal 15. Specifically, as shown in FIG. 1, the displacement inducing mechanism 18 is a pulling member (hereinafter may be denoted by the same symbol as that denoting the displacement inducing mechanism) connecting the second charging terminal 15 to the stand 16.

A pulling member 18 generates a pulling force as a reaction force when a lateral force is applied to the second charging terminal 15, pulls the second charging terminal 15, and then induces relative displacement between the first and the second charging terminals 14 and 15, the details of which will be described later.

The pulling member 18 extends approximately in the lateral direction of the stand 16. Then, one end of the pulling member 18 is connected to the pillar part 16*d* of the stand 16, and the other end of the pulling member 18 is connected to the second charging terminal 15. The pulling member 18 can be composed of, for example, an elastic member such as a stretchable rubber or a spring, and a wire made of iron. However, the material of the pulling member 18 is not limited.

It should be noted that the pulling member 18 may be connected to the pillar part 16*d* of the stand 16 and the second charging terminal 15 in a slightly slackened state, the detailed function of which will be described later. Further, the pulling member 18 may be located only on one side of the stand 16 in the lateral direction with the second charging terminal 15 interposed therebetween. Furthermore, one end of the pulling member 18 may be removable from the pillar part 16*d* of the stand 16 or the other end of the pulling member 18 be removable from the second charging terminal 15.

Figure 5A:
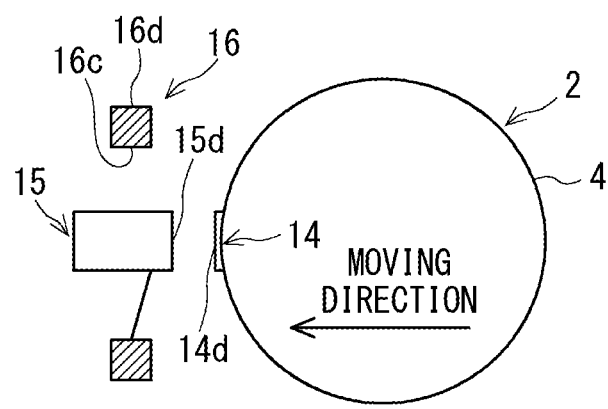
FIGS. 5A and 5B are diagrams showing a state viewed from above in which the charging terminals are magnetically connected to each other.
Figure 5B:
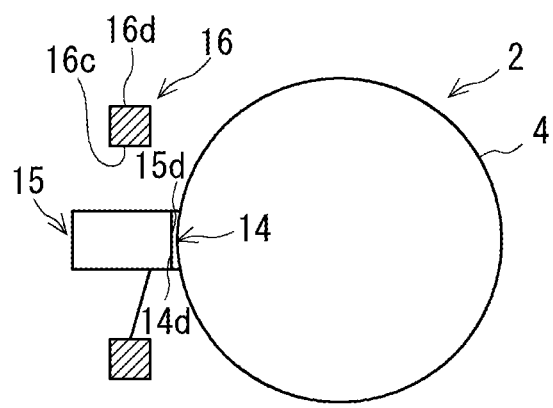
Figure 6A:
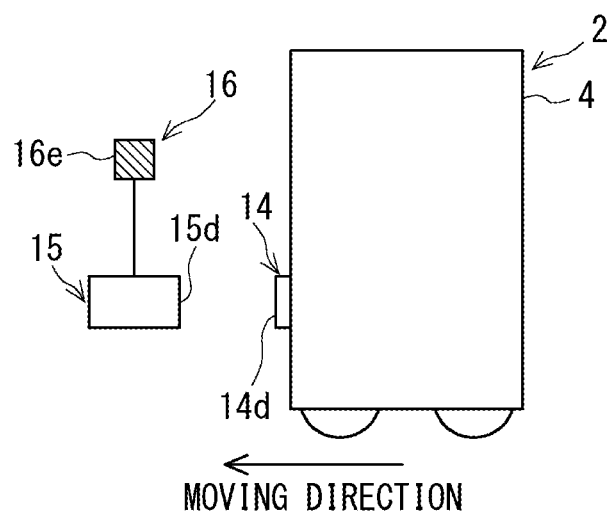
FIGS. 6A to 6C are side views showing a state in which the charging terminals are magnetically connected to each other.
Figure 6B:
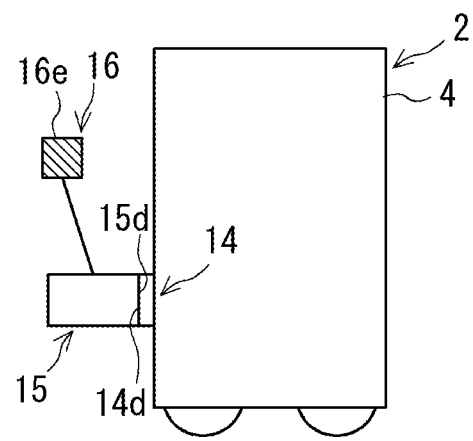
Figure 6C:
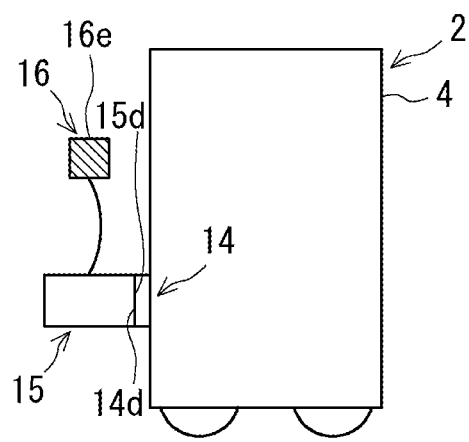

Next, a flow of magnetically connecting the charging terminals 14 and 15 to each other using the charging system 1 according to this embodiment is described. Note that FIGS. 5A and 5B are diagrams showing a state viewed from above in which the charging terminals are magnetically connected to each other, and FIG. 5A shows a state in which the mobile body approaches the charger in order to magnetically connect the charging terminals to each other, and FIG. 5B shows a state immediately after the charging terminals are magnetically connected to each other. FIGS. 6A to 6C are side views showing a state in which the charging terminals are magnetically connected to each other, and FIG. 6A shows a state in which the mobile body approaches the charger in order to magnetically connect the charging terminals to each other, FIG. 6B shows a state immediately after the charging terminals are magnetically connected to each other, and FIG. 6C schematically shows a state in which the mobile body has reached a predetermined charging position.

When the remaining amount of the battery 13 becomes equal to or less than a preset first threshold, the control unit 12 of the mobile body 2 controls the first and the second motors 10 and 11 so that the mobile body 2 approaches the charger 3 based on the position (i.e., predetermined charging position) information of the charger 3.

By doing so, as shown in FIGS. 5A and 6A, the mobile body 2 moves so that the first and the second charging terminals 14 and 15 face each other, and then the mobile body 2 moves in the penetrating direction of the opening 16*c* of the stand 16 of the charger 3 so that the first charging terminal 14 approaches the second charging terminal 15.

Then, as shown in FIGS. 5B and 6B, by the magnetic connecting force between the magnets 14*c* of the first charging terminal 14 and the magnets 15*c* of the second charging terminal 15, the second charging terminal 15 is attracted to the first charging terminal 14, the first and the second charging terminals 14 and 15 are then magnetically connected to each other, and the charging contacts 14*b* of the first charging terminal 14 and the charging contacts 15*b* of the second charging terminal 15 are electrically connected to one another. At this time, the mobile body 2 runs on to a part which projects from the frame part 16*a* in the base part 16*b* of the stand 16.

It should be noted that when the pulling member 18 is connected to the pillar parts 16*d* of the stand 16 and the second charging terminal 15 in a slightly slackened state, the second charging terminal 15 can be swung in the lateral direction of the stand 16. Thus, the position error between the first and the second charging terminals 14 and 15 can be absorbed.

Further, when the pulling member 18 is located only on one side of the stand 16 in the lateral direction with the second charging terminal 15 interposed therebetween, it is possible to more largely swing the second charging terminal 15 in the lateral direction of the stand 16.

Note that in order for the charging contacts 14*b* of the first charging terminal 14 and the charging contacts 15*b* of the second charging terminal 15 to be satisfactorily electrically connected to one another, the magnets 14*c* and 15*c* having different polarities may be alternately arranged in the first and the second charging terminals 14 and 15.

For example, in the first charging terminal 14, a total of six north-pole magnets 14*c* and south-pole magnets 14*c* are alternately arranged clockwise from the so-called 12 o'clock position at substantially equal intervals along the periphery of the surface 14*d* of the housing 14*a* as shown in FIG. 3.

Meanwhile, in the second charging terminal 15, a total of six south-pole magnets 15*c* and north-pole magnets 15*c* and are alternately arranged clockwise from the so-called 12 o'clock position at substantially equal intervals along the periphery of the surface 15*d* of the housing 15*a* as shown in FIG. 4.

By doing so, even when the second charging terminal 15 is about to be magnetically connected to the first charging terminal 14 in a state where the second charging terminal 15 has been rotated around the axis thereof, the second charging terminal 15 is magnetically connected to the first charging terminal 14 while the rotation of the second charging terminal 15 around the axis thereof is corrected due to the above-described arrangement of the magnets of the respective charging terminals. Accordingly, it is possible to electrically connect the charging contacts 14*b* of the first charging terminal 14 to the charging contacts 15*b* of the second charging terminal 15 with high accuracy.

After that, as shown in FIG. 6C, when the mobile body 2 further approaches the charger 3 and reaches a predetermined charging position, the control unit 12 of the mobile body 2 controls the first and the second motors 10 and 11 so that the mobile body 2 stops.

Meanwhile, for example, the control unit 19 of the charger 3 recognizes that the mobile body 2 has reached a predetermined charging position based on a signal indicating the position information of the mobile body 2, and that the first and the second charging terminals 14 and 15 are magnetically connected to each other based on a detection signal from a contact sensor or the like, and the control unit 19 of the charger 3 then supplies power to the charging contacts 15*b* of the second charging terminal 15.

By doing so, power is supplied to the battery 13 of the mobile body 2 from the charging contacts 15*b* of the second charging terminal 15 through the charging contacts 14*b* of the first charging terminal 14, whereby the battery 13 of the mobile body 2 can be charged. At this time, the mobile body 2 runs on to a part which projects from the frame part 16*a* in the base part 16*b* of the stand 16, whereby the battery 13 of the mobile body 2 can be charged in a state where the charger 3 is made stable.

Figure 7A:
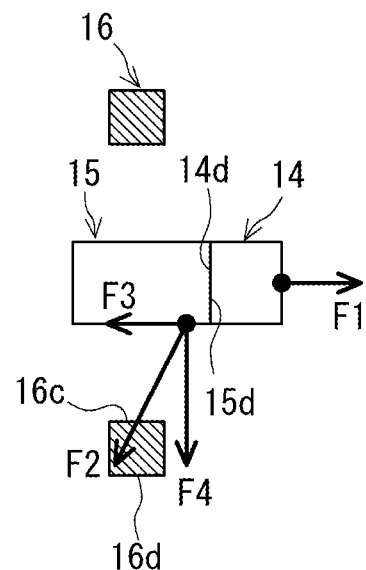
FIGS. 7A to 7C are diagrams showing a state viewed from above in which the charging terminals are disconnected from each other and the mechanical characteristics thereof.
Figure 7B:
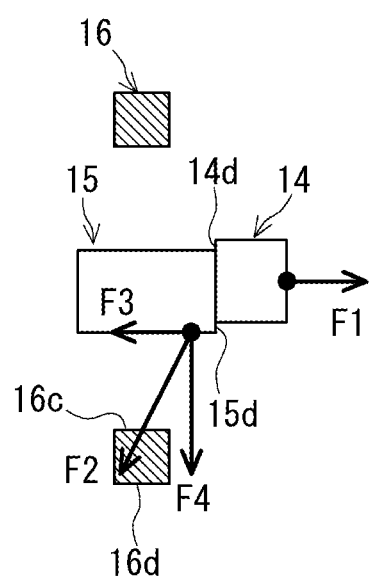
Figure 7C:
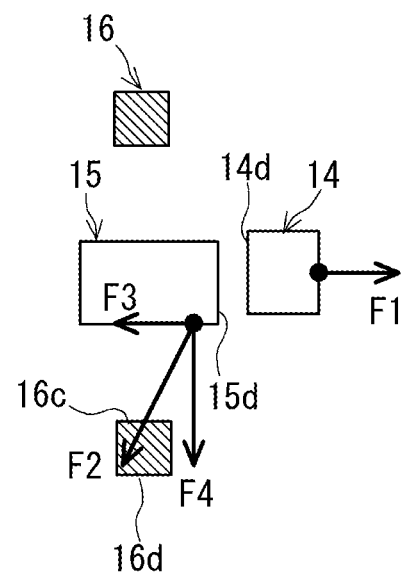

Next, a method for disconnecting a charging terminal using the charging system 1 according to this embodiment is described. FIGS. 7A to 7C are diagrams showing a state viewed from above in which the charging terminals are disconnected from each other and the mechanical characteristics thereof; and FIG. 7A shows a state before the charging terminals are disconnected from each other, FIG. 7B shows a state immediately before the charging terminal are disconnected from each other, and FIG. 7C shows a state in which the charging terminals have been disconnected from each other.

The control unit 12 of the mobile body 2 controls the first and the second motors 10 and 11 so that the mobile body 2 is spaced apart from the charger 3 when the remaining amount of the battery 13 becomes equal to or greater than a preset second threshold.

By doing so, as shown in FIG. 7A, the mobile body 2 moves in the direction in which it is spaced apart from the charger 3. For example, the mobile body 2 is moved in the penetration direction of the opening 16*c* of the stand 16 of the charger 3 so that the mobile body 2 is spaced apart from the charger 3.

Meanwhile, the control unit 19 of the charger 3 recognizes that the mobile body 2 is spaced apart from a predetermined charging position based on a signal indicating the position information of the mobile body 2, and then cuts off power supply to the charging contacts 15*b* of the second charging terminal 15. In this way, charging of the battery 13 of the mobile body 2 is completed.

With the above-described movement of the mobile body 2, the first and the second charging terminals 14 and 15 are moved, and the pulling member 18 is pulled and stretched by the mobile body 2. Thus, when the mobile body 2 pulls the second charging terminal 15 with force F1 through the first charging terminal 14, a reaction force F3 against the force F1 acts on the second charging terminal 15 by a pulling force F2 of the pulling member 18.

At this time, a divided force F4 of the pulling force F2 acts on the stand 16 in the lateral direction thereof, which is the direction different from the axial direction (i.e., the direction in which the mobile body 2 moves) of the second charging terminal 15, the second charging terminal 15 is pulled in the lateral direction of the stand 16 by the divided force F4, and relative movement between the first and the second charging terminals 14 and 15 is then induced.

Then, when the mobile body 2 further moves in the direction in which it is spaced apart from the charger 3, the second charging terminal 15 is rotated with the pulling member 18 as a radius while the second charging terminal 15 is moved with the first charging terminal 14, and as shown in FIG. 7B, the surface 15*d* of the second charging terminal 15 slides with respect to the surface 14*d* of the first charging terminal 14. As a result, relative displacement occurs between the first and the second charging terminals 14 and 15, and thus the magnetic connecting force between the first and the second charging terminals 14 and 15 is reduced.

When the mobile body 2 further moves in the direction in which it is spaced apart from the charger 3 in the aforementioned state, the first charging terminal 14 is disconnected from the second charging terminal 15 as shown in FIG. 7C. At this time, the magnetic connecting force between the first and the second charging terminals 14 and 15 is reduced as described above, and thus the force F1, by which the mobile body 2 pulls the second charging terminal 15 through the first charging terminal 14 in order to disconnect the first charging terminal 14 from the second charging terminal 15, can be reduced compared to that in the case disclosed in Japanese Patent No. 6115502 where the charging terminal of the mobile body is disconnected from the charging terminal of the charger.

Note that the amount of projection of the base part 16*b* of the stand 16 from the frame part 16*a* may be set to an amount such that the mobile body 2 runs on to a part which projects from the frame part 16*a* of the base part 16*b* until the first charging terminal 14 is disconnected from the second charging terminal 15. This enables the mobile body 2 to serve as a weight and makes the charger 3 stable when the first charging terminal 14 is disconnected from the second charging terminal 15.

Further, in a case where the suspension member 17 is composed of an elastic member, the suspension member 17 can be extended to maintain the height position of the second charging terminal 15 when the second charging terminal 15 is pulled by the first charging terminal 14. Thus, it is possible to prevent the first charging terminal 14 from being accidentally disconnected from the second charging terminal 15.

As described above, the charger 3, the charging system 1, and the method for disconnecting a charging terminal according to this embodiment make it possible to induce relative displacement between the first and the second charging terminals 14 and 15 in the direction different from the axial direction of the second charging terminal 15 when the first charging terminal 14 is disconnected from the second charging terminal 15 by the pulling member 18 of the charger 3. That is, as the mobile body 2 moves so as to be spaced apart from the charger 3, an area of the surface 14$d$ of the housing 14$a$ of the first charging terminal 14 brought into contact with the surface 15$d$ of the housing 15$a$ of the second charging terminal 15 can be reduced.

Thus, the force F1, by which the mobile body 2 pulls the second charging terminal 15 through the first charging terminal 14 in order to disconnect the first charging terminal 14 from the second charging terminal 15, can be reduced compared to that in the case disclosed in Japanese Patent No. 6115502 where the charging terminal of the mobile body is disconnected from the charging terminal of the charger.

Therefore, the charger 3 is less likely to fall over when it is pulled by the mobile body 2 and is reduced in weight compared to the charger disclosed in Japanese Patent No. 6115502, thereby improving the portability of the charger 3. In addition, as the charger 3 has such a simple configuration using the pulling member 18 as the displacement inducing mechanism, it is possible to prevent the weight of the charger 3 from increasing.

Note that in a case where the suspension member 17 and the pulling member 18 are removably connected to other members, the second charging terminal 15 can be disconnected from the stand 16 when the suspension member 17 and the pulling member 18 are removed from the other members. Thus, when the mobile body 2 is stopped at a place away from the charger 3, a user can disconnect the second charging terminal 15 from the stand 16 to carry it by hand and charge the mobile body 2.

Second Embodiment

In the first embodiment, the mobile body 2 is moved in the penetration direction of the opening 16$c$ of the stand 16 of the charger 3 so that the mobile body 2 is spaced apart from the charger 3. However, the mobile body 2 may be rotated around the rotation axis AX1 while the mobile body 2 is moved so as to be spaced apart from the charger 3.

Figure 8A:
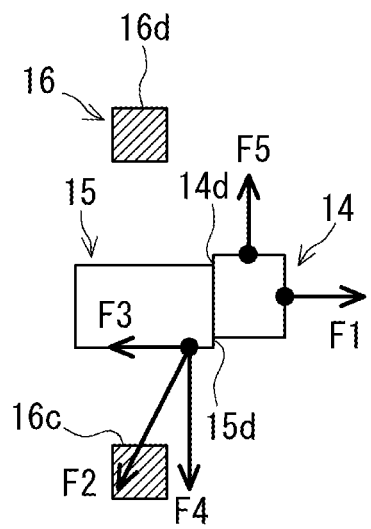
FIGS. 8A and 8B are diagrams showing a state viewed from above in which different charging terminals are disconnected from each other and the mechanical characteristics thereof.
Figure 8B:
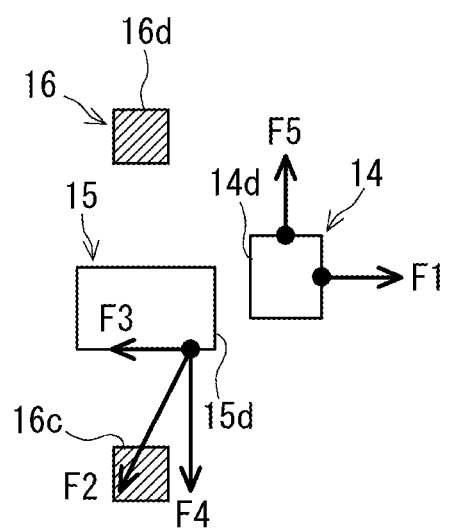

FIGS. 8A and 8B are diagrams showing a state viewed from above in which charging terminals are disconnected from each other and the mechanical characteristics thereof, and FIG. 8A shows a state immediately before the charging terminals are disconnected from each other, and FIG. 8B shows a state in which the charging terminals have been disconnected from each other. The control unit 12 of the mobile body 2 controls the first and the second motors 10 and 11 so that the mobile body 2 rotates around the rotation axis AX1 while the mobile body 2 moves so as to be spaced apart from the charger 3 when the remaining amount of the battery 13 becomes equal to or greater than a preset second threshold.

By doing so, the mobile body 2 is rotated around the rotation axis AX1 while the mobile body 2 moves so as to be spaced apart from the charger 3, and force F5 in the direction in which the mobile body 2 is rotated acts on the first charging terminal 14 as shown in FIGS. 8A and 8B.

In this embodiment as described above, as the mobile body 2 actively, relatively displaces the first charging terminal 14 and the second charging terminal 15 in the direction different from the axial direction of the second charging terminal 15, it is possible to relatively displace, even if the pulling force F2 of the pulling member 18 is small, the first and the second charging terminals 14 and 15 in the direction different from the axial direction of the second charging terminal 15 compared to that in the method for disconnecting a charging terminal according to the first embodiment.

Thus, the force F1, by which the mobile body 2 pulls the second charging terminal 15 through the first charging terminal 14 in order to disconnect the first charging terminal 14 from the second charging terminal 15, can be reduced compared to that in the method for disconnecting a charging terminal according to the first embodiment. Therefore, in this embodiment, it is possible to reduce the weight of the charger 3, thereby further improving the portability of the charger 3 compared to the charger 3 according to the first embodiment.

Third Embodiment

Figure 9:
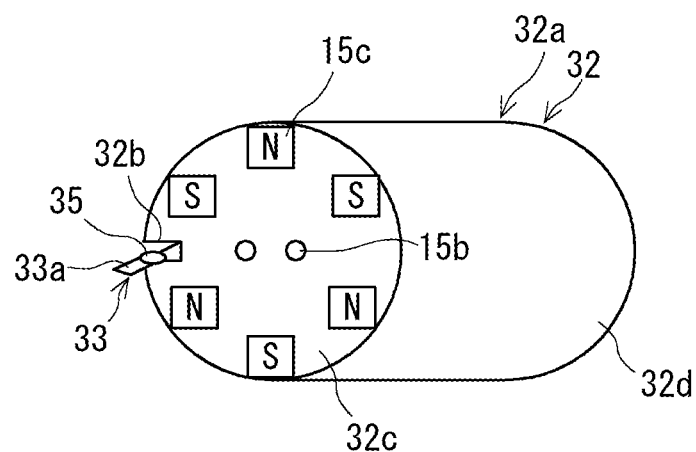
FIG. 9 is a perspective view schematically showing the second charging terminal and a displacement inducing mechanism according to a third embodiment.
Figure 10:
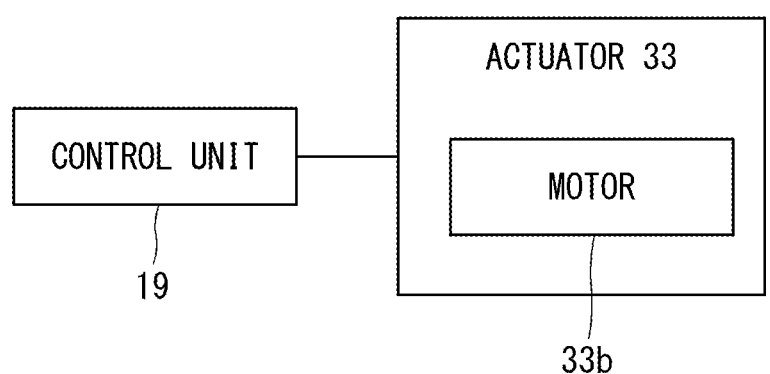
FIG. 10 is a block diagram of a control system of the charger according to the third embodiment.

In this embodiment, a configuration of the displacement inducing mechanism of the charging system is different from that of the other embodiments. First, a configuration of the second charging terminal and the displacement inducing mechanism according to this embodiment is described. FIG. 9 is a perspective view schematically showing the second charging terminal and the displacement inducing mechanism according to this embodiment. FIG. 10 is a block diagram of a control system of the charger according to this embodiment. Note that in the following description, duplicated explanations are omitted and the same reference symbols are used for the same members.

In a charger 31 according to this embodiment, an actuator 33 is provided as a displacement inducing mechanism in a second charging terminal 32 as shown in FIG. 9. Specifically, a housing 32$a$ of the second charging terminal 32 is substantially the same as the housing 15$a$ of the second charging terminal 15 according to the first embodiment, but additionally includes a notched part 32$b$ that notches the peripheral part of the housing 32$a$.

The notched part 32$b$ notches the peripheral part of one side (the right side in FIG. 9) of the housing 32$a$ in the lateral direction, and forms an opening in a surface (i.e., the surface facing the surface 14$d$ of the housing 14$a$ of the first charging terminal 14 when the battery 13 is charged) 32$c$ and a peripheral surface 32$d$ of the housing 32$a$. The notched part 32$b$ has, for example, a substantially rectangular shape when the second charging terminal 32 is viewed from the axial direction (i.e., the direction in which the central axis of the housing 32$a$ is extended), and extends in the axial direction of the housing 32$a$.

The actuator 33 includes a rotary bar 33$a$ and a motor 33$b$. The rotary bar 33$a$ is, for example, a thin flat plate having a substantially rectangular shape, one end of which is rotatably connected to a corner between the surface 32c and the peripheral surface 32d of the housing 32a in the notched part 32b.

The motor 33b operates based on the control of the control unit 19, and transmits a rotational driving force to the one end of the rotary bar 33a. Thus, when the rotational driving force is transmitted from the motor 33b to the one end of the rotary bar 33a, the rotary bar 33a rotates around a coupling part 35 between the one end of the rotary bar 33a and the housing 32a. At this time, the rotary bar 33a can pass through the notched part 32b of the housing 32a.

Figure 11:
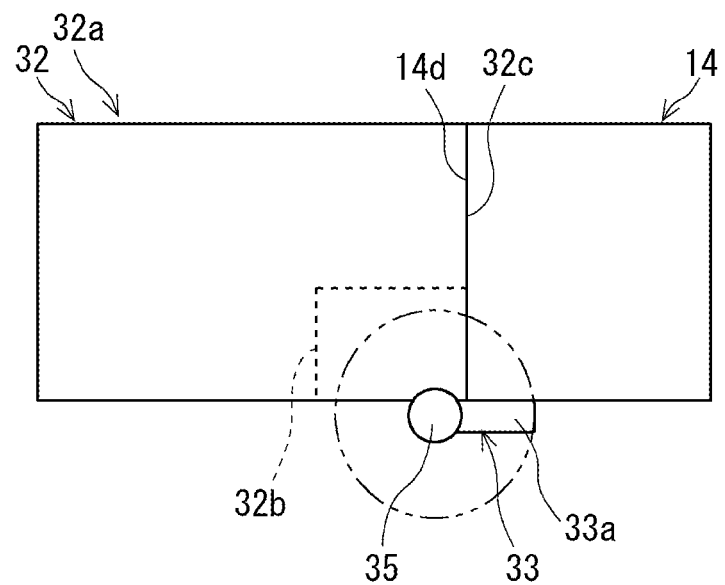
FIG. 11 is a diagram showing a state in which the first charging terminal and the second charging terminal are magnetically connected to each other.
Figure 12:
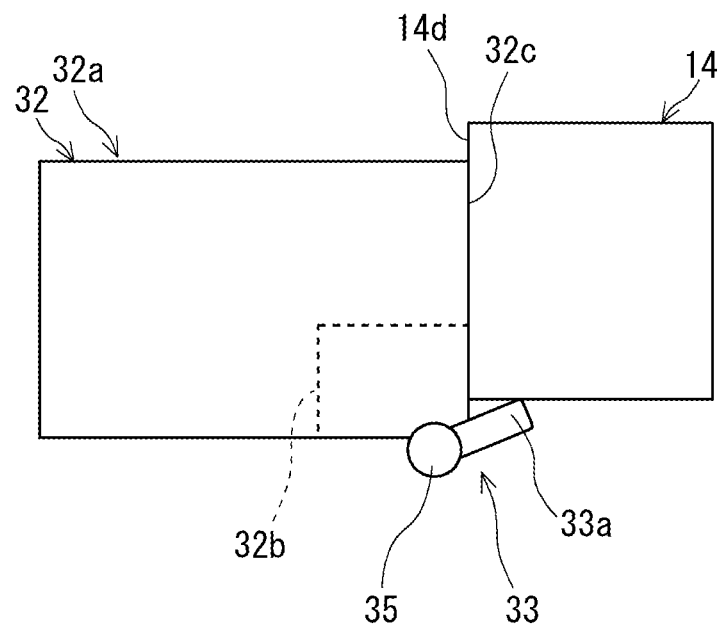
FIG. 12 is a diagram showing a state in which the first charging terminal and the second charging terminal have been relatively displaced.
Figure 13:
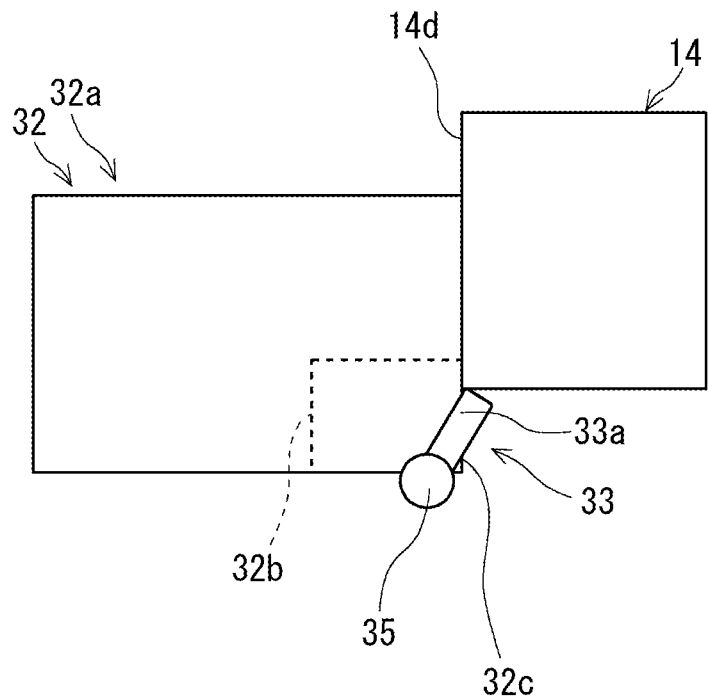
FIG. 13 is a diagram showing a state in which the first charging terminal and the second charging terminal have been further relatively displaced.
Figure 14:
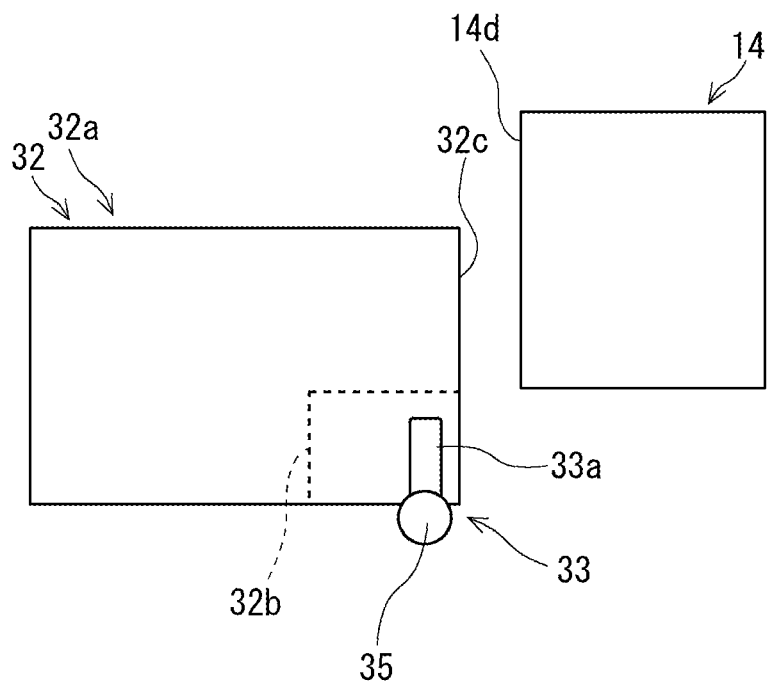
FIG. 14 is a diagram showing a state in which the first charging terminal has been disconnected from the second charging terminal.

Next, a flow of disconnecting the first charging terminal 14 using the second charging terminal 32 and the actuator 33 according to this embodiment is described. FIG. 11 is a diagram showing a state in which the first charging terminal and the second charging terminal are magnetically connected to each other. FIG. 12 is a diagram showing a state in which the first charging terminal and the second charging terminal have been relatively displaced. FIG. 13 is a diagram showing a state in which the first charging terminal and the second charging terminal have been further relatively displaced. FIG. 14 is a diagram showing a state in which the first charging terminal has been disconnected from the second charging terminal. Note that in FIGS. 11 to 14, the housing 32a is made invisible for the clarification of the operation of the rotary bar 33a.

Note that in a state where the first and the second charging terminals 14 and 32 are magnetically connected and the battery 13 of the mobile body 2 is charged, the rotary bar 33a of the actuator 33 is located so as to substantially come into contact with the peripheral surface of the first charging terminal 14 as shown in FIG. 1. Note that FIG. 11 indicates the rotation locus of the rotary bar 33a by a dot-dot-dash line.

In this state, when a signal indicating that the remaining amount of the battery 13 has become equal to or greater than the second threshold is transmitted from the control unit 12 of the mobile body 2 to the control unit 19 of the charger 31, the control unit 19 cuts off power supply to the charging contacts 15b of the second charging terminal 32 while it controls the motor 33b so that the rotary bar 33a is rotated to push the first charging terminal 14. Meanwhile, the control unit 12 of the mobile body 2 controls the first and the second motors 10 and 11, for example, to move the mobile body 2 in a direction in which it is spaced apart from the charger 31.

By doing so, the actuator 33 induces relative displacement between the first and the second charging terminals 14 and 32 in the direction different from the axial direction of the second charging terminal 32, and the surface 32c of the second charging terminal 32 then slides with respect to the surface 14d of the first charging terminal 14 as shown in FIG. 12. As a result, relative displacement occurs between the first and the second charging terminals 14 and 32 in the direction different from the axial direction of the second charging terminal 32, and thus the magnetic connecting force between the first and the second charging terminals 14 and 32 is reduced.

Further, the control unit 19 of the charger 31 controls the motor 33b so that the rotary bar 33a is rotated to push the first charging terminal 14, and the control unit 12 of the mobile body 2 controls the first and the second motors 10 and 11, for example, to move the mobile body 2 in a direction in which it is spaced apart from the charger 31.

By doing so, the surface 32c of the second charging terminal 32 slides with respect to the surface 14d of the first charging terminal 14 as shown in FIG. 13, and the amount of relative displacement between the first and the second charging terminals 14 and 32 in the direction different from the axial direction of the second charging terminal 32 is increased, and thus the magnetic connecting force between the first and the second charging terminals 14 and 32 is further reduced.

Then, the control unit 19 of the charger 31 controls the motor 33b so that the rotary bar 33a is rotated to push the first charging terminal 14, and the control unit 12 of the mobile body 2 controls the first and the second motors 10 and 11, for example, to move the mobile body 2 in a direction in which it is spaced apart from the charger 31, and consequently the first charging terminal 14 is disconnected from the second charging terminal 32 as shown in FIG. 14.

In this embodiment as described above, it is possible to induce relative displacement between the first and the second charging terminals 14 and 32 in the direction different from the axial direction of the second charging terminal 32 when the first charging terminal 14 is disconnected from the second charging terminal 32 by the actuator 33 of the charger 31. In addition, as the charger 31 has a simple configuration in which the first charging terminal 14 is pushed by the actuator 33, it is possible to prevent the weight of the charger 31 from increasing.

Accordingly, the force, by which the mobile body 2 pulls the second charging terminal 32 through the first charging terminal 14 in order to disconnect the first charging terminal 14 from the second charging terminal 32, can be reduced compared to that in the case disclosed in Japanese Patent No. 6115502 where the charging terminal of the mobile body is disconnected from the charging terminal of the charger.

Thus, the charger 31 is less likely to fall over when it is pulled by the mobile body 2 and is reduced in weight compared to the charger disclosed in Japanese Patent No. 6115502, thereby improving the portability of the charger 31.

Note that when the first charging terminal 14 is not magnetically connected to the second charging terminal 32, the rotary bar 33a may be housed in the notched part 32b of the second charging terminal 32 as shown in FIG. 14. This configuration makes it possible to prevent people or the like passing the periphery of the charger 31 from coming into contact with the rotary bar 33a.

Meanwhile, when the first charging terminal 14 is magnetically connected to the second charging terminal 32, the control unit 19 of the charger 31, for example, controls the motor 33b so that the rotary bar 33a substantially comes into contact with the peripheral surface of the first charging terminal 14 based on a detection signal of a contact sensor or the like.

Note that the shape of the notched part 32b of the second charging terminal 32 is not limited to the above-described shape, and may be any shape that allows the rotary bar 33a to pass therethrough. Further, the shape and the arrangement of the rotary bar 33a of the second charging terminal 32 may be any shape and arrangement that can push the first charging terminal 14. In short, the actuator 33 may have any configuration as long as it can relatively displace the first and the second charging terminals 14 and 32 in the direction different from the axial direction of the second charging terminal 32, and for example, the actuator 33 may be provided in the first charging terminal 14.

Fourth Embodiment

The surfaces of the first and the second charging terminals according to the first embodiment and the like are formed substantially flat, and the surfaces of the charging terminals can slide relative to each other. However, the charging terminals may be fitted to each other.

Figure 15:
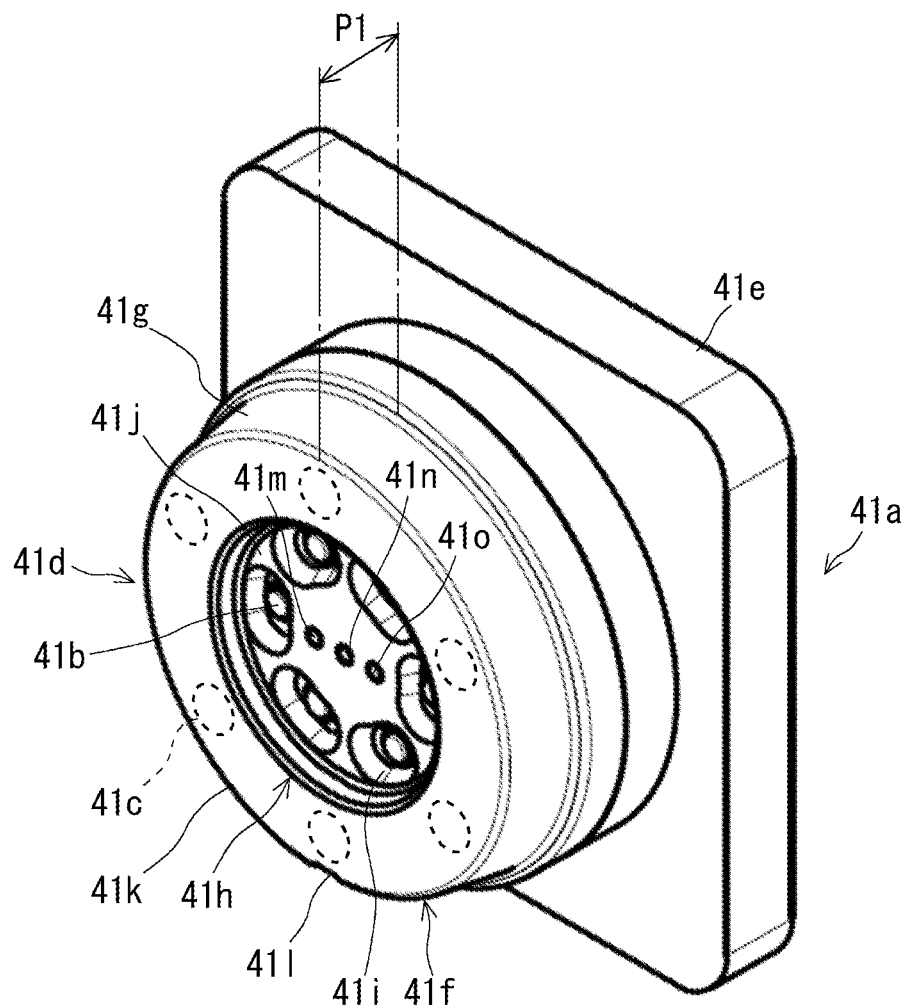
FIG. 15 is a perspective view schematically showing the first charging terminal according to a fourth embodiment.

First, a configuration of the first charging terminal according to this embodiment is described. FIG. 15 is a perspective view schematically showing the first charging terminal according to this embodiment. As shown in FIG. 15, a first charging terminal 41 includes a housing 41a, charging contacts 41b, and magnets 41c.

The housing 41a includes a convex part 41d and a base part 41e. The convex part 41d projects from the base part 41e. Specifically, the convex part 41d basically has a cylindrical shape in which one end of the convex part 41d is closed by a lid part 41f, and the end of the convex part 41d opposite to the lid part 41f is fixed to the base part 41e.

A peripheral surface 41g of the convex part 41d on the lid part 41f side is formed in a tapered shape the diameter of which is reduced toward the lid part 41f side. A first concave part 41h is formed substantially at the center of the lid part 41f when viewed from the axial direction of the convex part 41d (i.e., the direction in which the central axis of the convex part 41d is extended). The first concave part 41h has a substantially circular shape when viewed from the axial direction of the convex part 41d, and a second concave part 41i is formed on the bottom of the first concave part 41h.

The second concave part 41i has a substantially elliptical shape as viewed from the axial direction of the convex part 41d, and the peripheral surface of the second concave part 41i is formed in a tapered shape that becomes narrower toward the bottom of the second concave part 41i. A plurality of the above-described second concave parts 41i are arranged at substantially equal intervals along the periphery of a bottom surface 41j of the first concave part 41h. The base part 41e supports the convex part 41d and has, for example, a flat plate shape.

The charging contacts 41b are arranged inside the second concave part 41i of the convex part 41d, and are exposed from the lid part 41f of the convex part 41d. At this time, the charging contacts 41b may be arranged so as not to project from the bottom surface 41j of the first concave part 41h of the convex part 41d. This configuration makes it possible to prevent people around the mobile body 2 from coming into contact with the charging contacts 41b. The magnets 41c are arranged so as to surround the first concave part 41h in the vicinity of a surface 41k of the lid part 41f of the convex part 41d.

In the above-described first charging terminal 41, the base part 41e is fixed to the body part 4 of the mobile body 2 so that the surface 41k of the lid part 41f of the convex part 41d is exposed from the peripheral surface of the body 4 of the mobile body 2.

Figure 16:
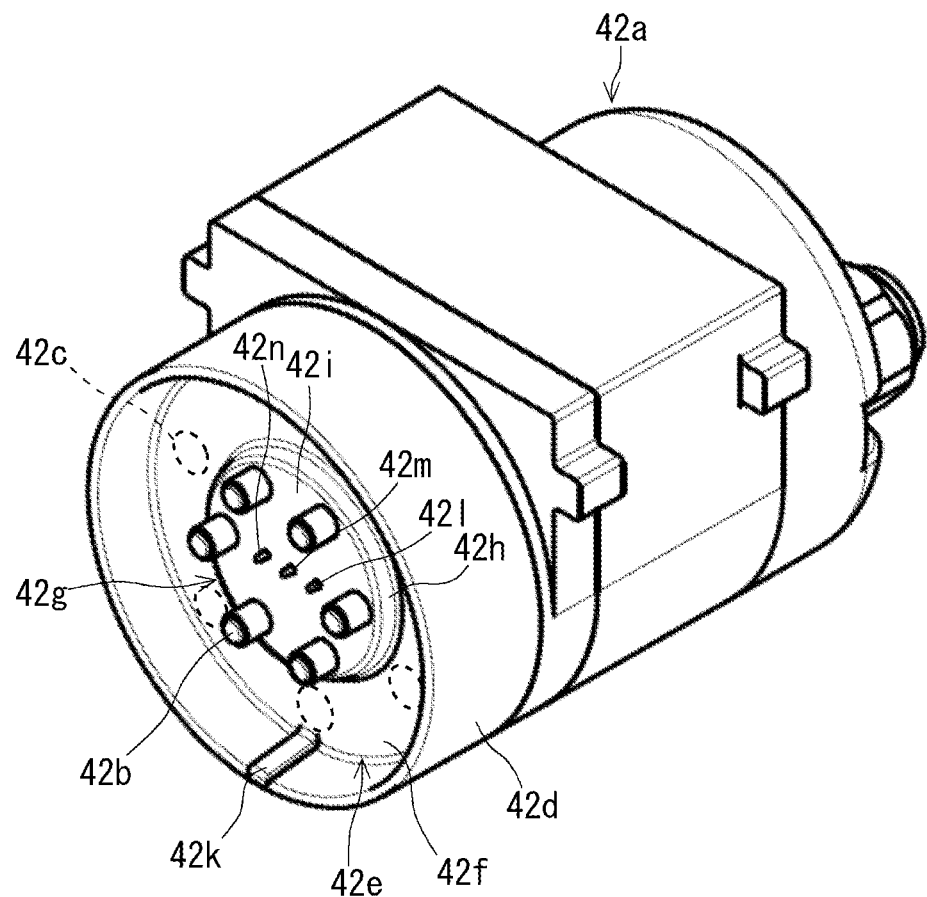
FIG. 16 is a perspective view schematically showing the second charging terminal according to the fourth embodiment.

Next, a configuration of the second charging terminal according to this embodiment is described. FIG. 16 is a perspective view schematically showing the second charging terminal according to this embodiment. As shown in FIG. 16, a second charging terminal 42 includes a housing 42a, charging contacts 42b, and magnets 42c.

The housing 42a includes a cylindrical part 42d and a lid part 42e. The inner diameter of the cylindrical part 42d is substantially equal to the diameter of an insertion part P1 (see FIG. 15) of the convex part 41d of the first charging terminal 41 on the base part 41e side so that the insertion part P1 can be inserted into one end of the cylindrical part 42d.

The lid part 42e closes the penetrating part of the cylindrical part 42d. The lid part 42e is located at a position recessed from one end of the cylindrical part 42d. It should be noted that the depth of the cylindrical part 42d from one end thereof to a surface 42f of the lid part 42e is substantially equal to the height of the insertion part P1 of the convex part 41d of the first charging terminal 41 so that the insertion part P1 of the convex part 41d of the first charging terminal 41 can be inserted into the one end of the cylindrical part 42d.

A convex part 42g inserted into the first concave part 41h of the first charging terminal 41 is formed substantially at the center of the surface 42f of the lid part 42e when viewed from the axial direction of the cylindrical part 42d (i.e., the direction in which the central axis of the cylindrical part 42d is extended). The convex part 42g has a substantially circular shape when viewed from the axial direction of the cylindrical part 42d, and the height of the convex part 42g is approximately equal to the depth of the first concave part 41h of the first charging terminal 41. Further, a peripheral surface 42h of the convex part 42g is formed in a tapered shape the diameter of which is reduced toward one end side of the cylindrical part 42d.

The charging contacts 42b project from the surface 42i of the convex part 42g, and are arranged so as to correspond to the charging contacts 41b of the first charging terminal 41. At this time, the charging contacts 42b may be arranged so as not to project from one end of the cylindrical part 42d. This configuration makes it possible to prevent people around the charger from coming into contact with the charging contacts 42b. The magnets 42c are arranged to surround the convex part 42g in the vicinity of the surface 42f of the lid part 42e.

When the above-described first and the second charging terminals 41 and 42 are magnetically connected, the insertion part P1 of the convex part 41d of the first charging terminal 41 is inserted into one end of the cylindrical part 42d of the second charging terminal 42, whereby they are fitted to each other. Then, the surface 41k of the convex part 41d of the first charging terminal 41 substantially comes into contact with the surface 42f of the lid part 42e of the second charging terminal 42, and the convex part 42g of the second charging terminal 42 is inserted into the first concave part 41h of the first charging terminal 41, whereby they are fitted to each other. In this way, the charging contacts 41b of the first charging terminal 41 and the charging contacts 42b of the second charging terminal 42 are electrically connected to one another.

It should be noted that the peripheral surface of the second concave part 41i of the first charging terminal 41 is formed in a tapered shape. Thus, even if the positional deviation occurs between the charging contacts 41b of the first charging terminal 41 and the charging contacts 42b of the second charging terminal 42, it is possible to guide the charging contacts 42b of the second charging terminal 42 to the charging contacts 41b of the first charging terminal 41 on the peripheral surface of the second concave part 41i of the first charging terminal 41. Therefore, it is possible to reliably electrically connect the charging contacts 41b of the first charging terminal 41 to the charging contacts 42b of the second charging terminal 42.

Meanwhile, when the first charging terminal 41 is disconnected from the second charging terminal 42, force is applied to the second charging terminal 42 so that a relative displacement of the first and the second charging terminals 41 and 42 in the direction different from the axial direction of the second charging terminal 42 is induced by the displacement inducing mechanism in the same manner as that in the first to the third embodiments. Thus, the second charging terminal 42 is rotated so as to bend at the fitting part between the first and the second charging terminals 41 and 42, and the first charging terminals 41 is then disconnected from the second charging terminals 42.

At this time, the peripheral surface 41g of the convex part 41d of the first charging terminal 41 on the lid part 41f side and the peripheral surface 42h of the convex part 42g of the second charging terminal 42 are formed in a tapered shape, and consequently the operation of the second charging terminal 42 is not obstructed when the second charging terminal 42 is about to be rotated so as to bend at the fitting part between the first and the second charging terminals 41 and 42. Thus, it is possible to satisfactorily disconnect the first charging terminal 41 from the second charging terminal 42.

Note that even in this embodiment, the magnets 41c and 42c having different polarities may be alternately arranged in the first and the second charging terminals 41 and 42.

Further, a guide groove 411 may be formed on the peripheral surface 41g of the convex part 41d of the first charging terminal 41, and that a guide convex part 42k be formed on one side of the inner peripheral surface of the cylindrical part 42d of the second charging terminal 42.

For example, the guide groove 411 extends in the axial direction of the convex part 41d of the first charging terminal 41, and the guide convex part 42k extends in the axial direction of the cylindrical part 42d of the second charging terminal 42. Further, the charging contacts 41b and 42b are arranged so as to electrically come into contact with one another while the guide convex part 42k is inserted into the guide groove 411.

This configuration makes it possible to satisfactorily electrically connect the charging contacts 41b and 42b to one another when the guide convex part 42k of the second charging terminal 42 is inserted into the guide groove 411 of the first charging terminal 41 at the time of inserting the convex part 41d of the first charging terminal 41 into one end of the cylindrical part 42d of the second charging terminal 42.

However, the guide convex part may be formed in the first charging terminal 41, and the guide groove may be formed in the second charging terminal 42. Further, the arrangement and the shape of the guide groove and the guide convex part are not limited as long as the charging contacts 41b and 42b can be satisfactorily electrically connected to one another when the convex part 41d of the first charging terminal 41 is inserted into one end of the cylindrical part 42d of the second charging terminal 42.

It should be noted that the mobile body and the charger can recognize that the charging terminals are magnetically connected to each other. Specifically, the first charging terminal 41 includes a communication contact 41m, a ground contact 41n, and a disconnection detection contact 41o that are exposed from the bottom surface 41j of the first concave part 41h. Meanwhile, the second charging terminal 42 includes a communication contact 42l, a ground contact 42m, and a disconnection detection contact 42n that are exposed from the surface 42i of the convex part 42g.

The aforementioned communication contact 41m, ground contact 41n, and disconnection detection contact 41o of the first charging terminals 41 can be electrically connected to the communication contact 42l, the ground contact 42m, and the disconnection detection contact 42n of the second charging terminal 42, respectively, while the first and the second charging terminals 41 and 42 are magnetically connected to each other.

Further, a weak power is supplied to the disconnection detection contact 42n of the second charging terminal 42, and when the first and the second charging terminals 41 and 42 are magnetically connected to each other, a weak power is supplied from the disconnection detection contact 42n of the second charging terminal 42 to the disconnection detection contact 41o of the first charging terminal 41.

When the control unit 12 of the mobile body 2 receives a weak power supplied from the charger 3, it transmits, from the communication contact 41m of the first charging terminal 41 to the communication contact 42l of the second charging terminal 42, a signal indicating that the first and the second charging terminals 41 and 42 are magnetically connected to each other.

When the control unit 19 of the charger 3 receives the signal indicating that the first and the second charging terminals 41 and 42 are magnetically connected to each other, it starts power supply from the charging contacts 42b of the second charging terminal 42 to the charging contacts 41b of the first charging terminal 41. Thus, it is possible to safely supply power from the charger 3 to the mobile body 2.

In the above-described configuration, when the first charging terminal 41 is disconnected from the second charging terminal 42, the disconnection detection contact 41o of the first charging terminal 41 and the disconnection detection contact 42n of the second charging terminal 42 may be electrically disconnected from each other before the charging contacts 41b of the first charging terminal 41 and the charging contacts 42b of the second charging terminal 42 are electrically disconnected from each other.

For example, the charging contacts 41b of the first charging terminal 41 can be stroked by an elastic member such as a spring in the axial direction of the convex part 41d, or the charging contacts 42b of the second charging terminal 42 can be stroked by an elastic member such as a spring in the axial direction of the cylindrical part 42d.

Further, even if the first and the second charging terminals 41 and 42 are magnetically disconnected from each other, the charging contacts 41b of the first charging terminal 41 or the charging contacts 42b of the second charging terminal 42 are pushed by an elastic member, whereby the charging contacts 41b and 42b continue to be electrically connected to each other until the disconnection detection contact 41o of the first charging terminal 41 and the disconnection detection contact 42n of the second charging terminal 42 are electrically disconnected from each other.

This configuration can prevent an are from being generated between the charging contacts 41b of the first charging terminal 41 and the charging contacts 42b of the second charging terminal 42 when the first charging terminal 41 is disconnected from the second charging terminal 42.

The present disclosure is not limited to the above-described embodiments, and can be appropriately changed without departing from the spirit of the disclosure.

For example, in the aforementioned embodiments, whether the first and the second charging terminals are magnetically connected to each other is recognized by using a contact sensor or the like, or transmitting and receiving a signal between the mobile body and the charger. However, any method that can recognize that the first and the second charging terminals are connected or disconnected to or from each other can be employed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The present application is based on the fruit of "Formation technology development project of next-generation robot society in a robot field (a robotic smart home where elderly people can live safely and comfortably)" by "Priority research project of Knowledge Hub Aichi".

What is claimed is:

1. A charger comprising a second charging terminal configured to be magnetically connected to a first charging terminal provided on a mobile body to supply power to the first charging terminal, the charger further comprising:
    a stand;
    a suspension member comprising an elastic material that is configured to suspend the second charging terminal from the stand, such that the suspension member enables the second charging terminal to swing from the stand; and
    a displacement inducing mechanism configured to induce, in order to reduce a magnetic connecting force between the first and the second charging terminals, relative displacement between the first and the second charging terminals in a direction different from an axial direction of the second charging terminal, wherein
    the displacement inducing mechanism comprises a pulling member configured to connect the stand to the second charging terminal, and
    the pulling member generates a pulling force as a reaction force when a lateral force is applied to the second charging terminal, pulls the second charging terminal, and then induces relative displacement between the first and the second charging terminals.

2. The charger according to claim 1, wherein
    the pulling member is located on one side of the stand in a lateral direction thereof with the second charging terminal interposed therebetween,
    one end of the pulling member is connected to the stand, and
    the other end thereof is connected to the second charging terminal.

3. A charging system comprising:
    the charger according to claim 1; and
    a mobile body comprising the first charging terminal.

4. A method for disconnecting a charging terminal comprising disconnecting a first charging terminal provided in a mobile body from a second charging terminal suspended by a suspension member comprising an elastic material from a stand of a charger, such that the suspension member enables the second charging terminal to swing from the stand, from a state where the first charging terminal and the second charging terminal are magnetically connected to each other, the method comprising
    inducing, in order to reduce a magnetic connecting force between the first and the second charging terminals, relative displacement between the first and the second charging terminals in a direction different from an axial direction of the second charging terminal, wherein the mobile body is moved in a direction in which it is spaced apart from the charger, and the second charging terminal is pulled by a pulling member connecting the stand to the second charging terminal when a lateral force is applied to the second charging terminal.

5. The method for disconnecting a charging terminal according to claim 4, wherein the mobile body is rotated while it is moved in the direction in which the mobile body is spaced apart from the charger.

* * * * *